United States Patent
Eberlein et al.

(10) Patent No.: US 7,739,387 B2
(45) Date of Patent: Jun. 15, 2010

(54) SYSTEM AND METHOD FOR MESSAGE PACKAGING

(75) Inventors: Peter Eberlein, Malsch (DE); Timm Falter, Sinsheim (DE); Voker Wiechers, Heidelberg (DE)

(73) Assignee: SAP AG, Walldorf (DE)

( * ) Notice: Subject to any disclaimer, the term of this patent is extended or adjusted under 35 U.S.C. 154(b) by 385 days.

(21) Appl. No.: 11/716,106

(22) Filed: Mar. 8, 2007

(65) Prior Publication Data
US 2008/0222248 A1    Sep. 11, 2008

(51) Int. Cl.
*G06F 15/173* (2006.01)
(52) U.S. Cl. .......................... 709/226; 707/1
(58) Field of Classification Search ................ 709/226, 709/230; 707/1; 710/54
See application file for complete search history.

(56) References Cited

U.S. PATENT DOCUMENTS

| | | | | |
|---|---|---|---|---|
| 5,377,329 A | * | 12/1994 | Seitz | 710/54 |
| 7,028,091 B1 | * | 4/2006 | Tripathi et al. | 709/230 |
| 7,080,158 B1 | * | 7/2006 | Squire | 709/245 |
| 7,191,392 B1 | * | 3/2007 | Coar | 715/234 |
| 2002/0065795 A1 | * | 5/2002 | Asherman | 707/1 |
| 2007/0106932 A1 | * | 5/2007 | Coar | 715/512 |
| 2007/0266159 A1 | * | 11/2007 | Doppelhamer et al. | 709/226 |
| 2007/0286575 A1 | * | 12/2007 | Oashi et al. | 386/95 |

FOREIGN PATENT DOCUMENTS

| | | |
|---|---|---|
| EP | 1 191 438 | 3/2002 |
| FR | 2 683 341 | 5/1993 |
| WO | WO-2005/074234 | 8/2005 |

OTHER PUBLICATIONS

EP Search Report mailed Jul. 16, 2008, 8 Pages.

* cited by examiner

*Primary Examiner*—Aaron Strange
*Assistant Examiner*—Michael A Chambers
(74) *Attorney, Agent, or Firm*—Mintz, Levin, Cohn, Ferris, Glovsky and Popeo, P.C.

(57) ABSTRACT

A system and method for virtual message packaging is described. A virtual package is collection of messages that share common characteristics and may be processed together. In one embodiment, messages are first grouped according to one or more rules at a client and then formed into a virtual package. In another embodiment, one or more messages are received at a server and then formed into a virtual package for later processing.

16 Claims, 8 Drawing Sheets

SYSTEM AND METHOD FOR MESSAGE PACKAGING

FIELD OF INVENTION

The field of invention relates generally to the software arts, and, more specifically, to a message transactions.

BACKGROUND

The term "Web services" is understood to mean a standards-based, service oriented architecture (SOA) than can be used to engage in business relationships (e.g., buying and selling) in a partially or wholly automated fashion over a public network such as the Internet ("the Web"). Standards bodies and interoperability organizations that have contributed to the Web services effort include the World Wide Web Consortium (W3C), the Organization for the Advancement of Structured Information Standards (OASIS), the Internet Engineering Task Force (IETF) and the Web Services Interoperability Organization (WS-I).

FIG. 1 shows a Web services model 100 that includes a registry 101, a service provider 102 and a service consumer 103. A service consumer 103, or "service requester", is generally understood to be an entity that seeks and (in cases where a suitable Web service is found) uses a particular Web service through a network 104. The registry 101 includes listings of various "available" services, and, may assist the service consumer 103 in searching for a suitable service provider based on the web servicing needs of the service consumer 103. A service provider 102 is the provider of one or more Web services that can be accessed over the network 104. Because of the vast expanse of the Internet and interest in automated business engagements, many registries, service consumers and service providers may be in operation at any instant of time.

Presently, the responsibilities of the most prevalent registry function 101 that is associated with the Web services effort are defined in various Universal Discovery, Description and Integration (UDDI) specifications provided by uddi.org. Besides providing listings of available services, a UDDI registry 101 may also make available to a service consumer 103 additional details that pertain to any particular Web service such as: 1) the location of the Web service (e.g., its URI specified by a specific network destination address or name); 2) the capabilities of the Web service (e.g., specific methods that are supported by the Web service and that may be called upon by the service consumer); and, 3) communication semantics needed for invoking the Web service through the network 104 (e.g., the structure of a messaging format and/or protocol needed to properly communicate with the Web service).

According to one widely adopted approach, such "additional details" are described in Web Services Directory Language (WSDL) text documents written in extensible Markup Language (XML). Here, for example, for each Web service that the registry 101 maintains a listing of, the registry 101 also maintains a WSDL document that describes the location, capabilities, and communication semantics of the Web service. Presently, a WSDL document for a particular Web service is expected to include an "abstract interface" description of the Web service (which includes the Web service's methods and the data passed between the Web service provider and Web service consumer) and a "concrete implementation" description of the Web service (which includes specific protocol and data format specifications for communicating with the Web service (referred to as a "binding") and the location of the Web service (referred to as a "port")).

According to another widely adopted approach, with respect to the actual communication that occurs between the service consumer 103 and the service provider 102, such communication is implemented through an exchange of Simple Object Access Protocol (SOAP) messages written in XML. A SOAP message includes an envelope 105 that further contains a header 106 (which may be optional) and a body 107.

For a particular Web service, the header 106 is typically used to pass "control" information associated with the consumer's Web service engagement with the Web service provider (e.g., information used for performing encryption/decryption and/or signature checking, information used to ensure proper ordering of SOAP messages, information that identifies the ultimate destination of the SOAP message, etc.). The body 107 is used to pass more "substantive" information associated with the service consumer's Web service experience (e.g., a specific method call from the service consumer to the service provider, or, a specific response generated by the service provider in response to a specific method call).

SOAP messages are typically deemed to be insensitive to the particular type of transport protocol used to transport them through the network 104. Thus, even though most SOAP messages are appended with an Hypertext Transport Protocol (HTTP) header, a header specific to a different type of transport protocol (e.g., HTTPS, SMTP, etc.) could be appended to the SOAP envelope 105 instead (e.g., if the service provider, service consumer and/or intermediary nodes were adapted to use the different type of protocol).

In basic cases where a service provider 102 receives a SOAP message sent by a service consumer 103, or, where a service consumer 103 receives a SOAP message sent by a service provider 102, the body of the SOAP message 107 essentially represents the purpose of the communication between the service provider 102 and service consumer 103. For instance, in the case of a SOAP message being sent by a service consumer 103 and received by a service provider 103, the purpose of the SOAP message may be that the service requester 103 desires that the service requester 102 perform a specific method. In this case, the body of the SOAP message 107 is apt to contain both a request to perform the specific method and any input parameters that are both needed by the method and determined by the service requester 103.

Presently, largely because of its versatility, the SOAP message is regarded as a primary unit of information transfer between a service provider 102 and a service consumer 103 in a Web services environment. Here, unlike many other kinds of messaging protocols, existing SOAP message specifications define a format that is relatively "abstract" in terms of its content and/or organizational requirements. Essentially, it is believed that a relatively abstract messaging format definition lends itself to having the versatility needed to support business relationship models of all different kinds (e.g., in terms of business relationship type and procedure), which, in turn, represents an overarching design goal of those designing the Web services infrastructure.

Nevertheless, for many types of business relationships, too much abstractness may correspond to the absence of specific structure deemed necessary to implement a truly workable automated business practice. For instance, a significant number of business models are expected to require confidentiality and/or assurances as to whom its SOAP message oriented communication is being entertained between. A significant number of business models are also expected to require guarantees that received SOAP messages will be processed in a specific order. Further still, a significant number of business models may desire to have the end-to-end communication path between service provider and service consumer be supported by different types of transport protocols (e.g., a first leg that is transported by HTTP and a second leg that is transported by SMTP).

FIG. 2 illustrates a prior art message transaction flow between a client and a server using a stateless HTTP connection. HTTP is a transactional protocol with the lifetime of a connection corresponding to a single request-reply sequence.

A client establishes a Transmission Control Protocol/Internet Protocol (TCP/IP) connection with a particular port/socket of a server at 201. The server opens the connection on its end and waits for a request message from the client at 203.

A request message is transmitted to the server from the client at 205. This message may be one that is requesting a document, header, for some action to be performed, etc. The client waits for a response message to be sent from the server after sending this request message.

Upon receiving the request at 207, the server processes the request (including committing the request) at 209 and transmits a response message to the client at 211. The client receives this response message at 213.

Once the request-reply sequence is completed, the socket is closed. For example, as shown both the client and server close the connection at 215 and 217 respectively. However, either the client or the server can close the stateless connection at any time for any reason.

FIG. 3 illustrates a prior art message transaction flow between a client and a server using a stateful HTTP connection. While HTTP is normally a transactional protocol with the lifetime of a connection corresponding to a single request-reply sequence, HTTP may be adapted to use state information through the use of cookies. A cookie is a small segment of text sent by a server to a client and then sent back to the server by the client (either with changes or unchanged) each time it accesses that server. The server may add information to an existing cookie prior sending or re-sending it to a client. Cookies are used for authenticating, tracking, and maintaining specific information about users, such as site preferences and the contents of electronic shopping carts.

A client establishes a stateful Transmission Control Protocol/Internet Protocol (TCP/IP) connection with a particular port/socket of a server at 301. A stateful connection in this scenario means that cookies will be used to save the state of the transaction. The server opens the connection on its end and waits for a request message from the client at 303.

A request message is transmitted to the server from the client at 305. This message may be a request for a document, header, some action to be performed, etc. The client waits for a response message to be sent from the server after sending this request message.

Upon receiving the request at 307, the server processes the request (including committing the request) and creates or edits a cookie associated with the client at 309, and transmits a response message (including cookie) to the client at 311. The client receives the response message at 313.

Once the request-reply sequence is completed, the socket is closed. For example, as shown both the client and server close the connection at 315 and 317 respectively. However, either the client or the server can close the stateful connection at any time. Like the stateless HTTP communication scheme, stateful HTTP communication ends after one request/response scenario, however, a state associated with the transaction is maintained in the form of a cookie and the next request/response cycle should include the cookie with all messages.

Transmitting, receiving, and processing a large number of messages (such as SOAP or HTTP messages) cause performance bottlenecks in the above prior art flows and architectures. For both the stateless and stateful communications, a message received by a server is committed and processed immediately. If there are a relatively large number of messages (for example, on the order of one-hundred or more) this processing may adversely tie up resources in the server. Additionally, if a group of messages is to be processed in a certain order, but the server does not receive these messages in that order, the server will not process the group correctly (as it processes the messages in the order that it receives them). This erroneous group processing will, at worst, require a rollback to the state prior to the reception of any member of the group. Additionally, there is no current standards acceptable way of packaging several messages together using Web services. An example of a bottleneck attributable to transmitting and receiving is the necessity of having to "log" onto a server every time a message is to be sent from a client to a server in a stateless communication.

BRIEF DESCRIPTION OF THE DRAWINGS

The present invention is illustrated by way of example, and not limitation, in the figures of the accompanying drawings in which like references indicate similar elements and in which.

SUMMARY

Figure 1:
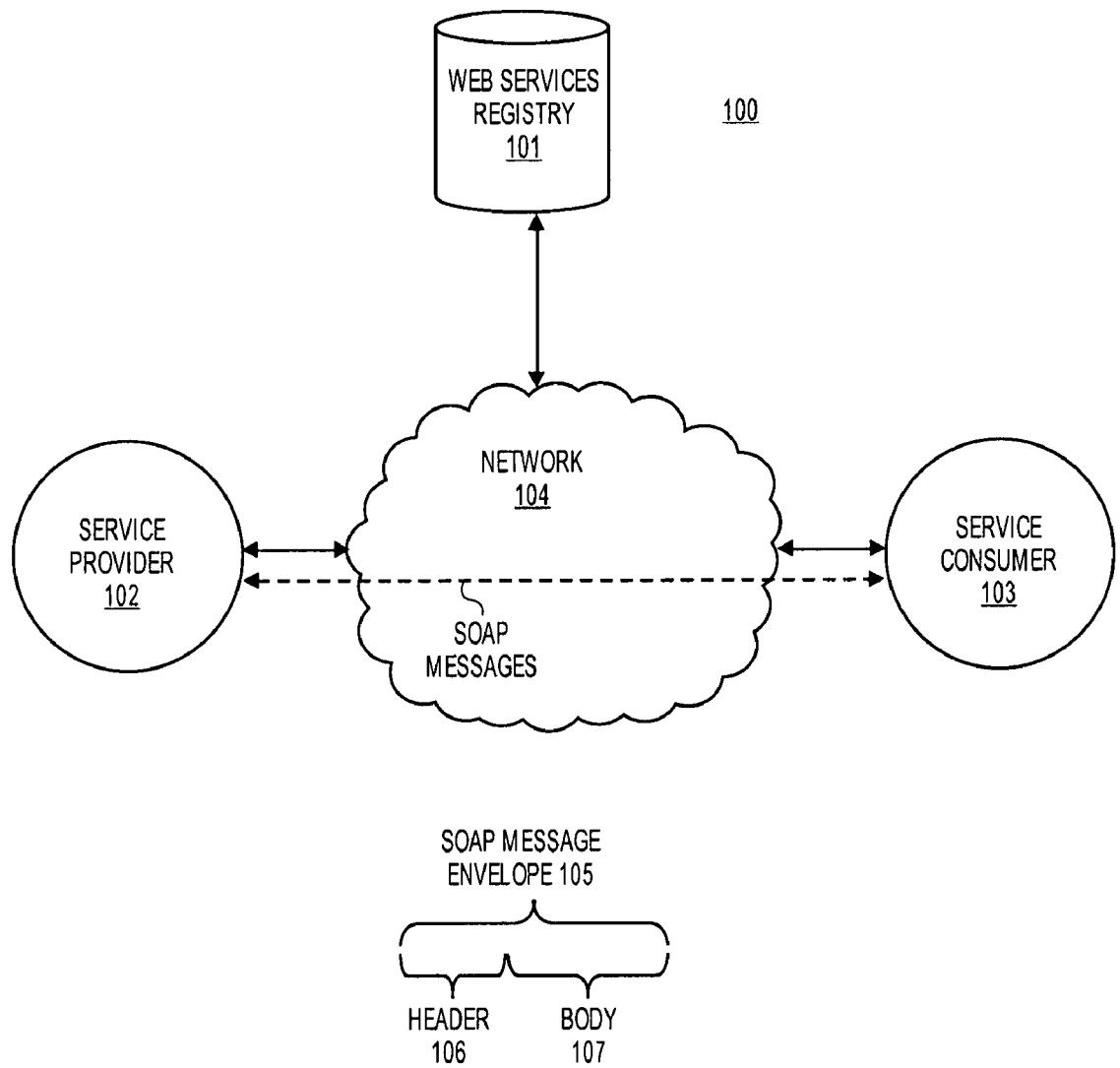
FIG. 1 shows a Web services model (prior art)
Figure 2:
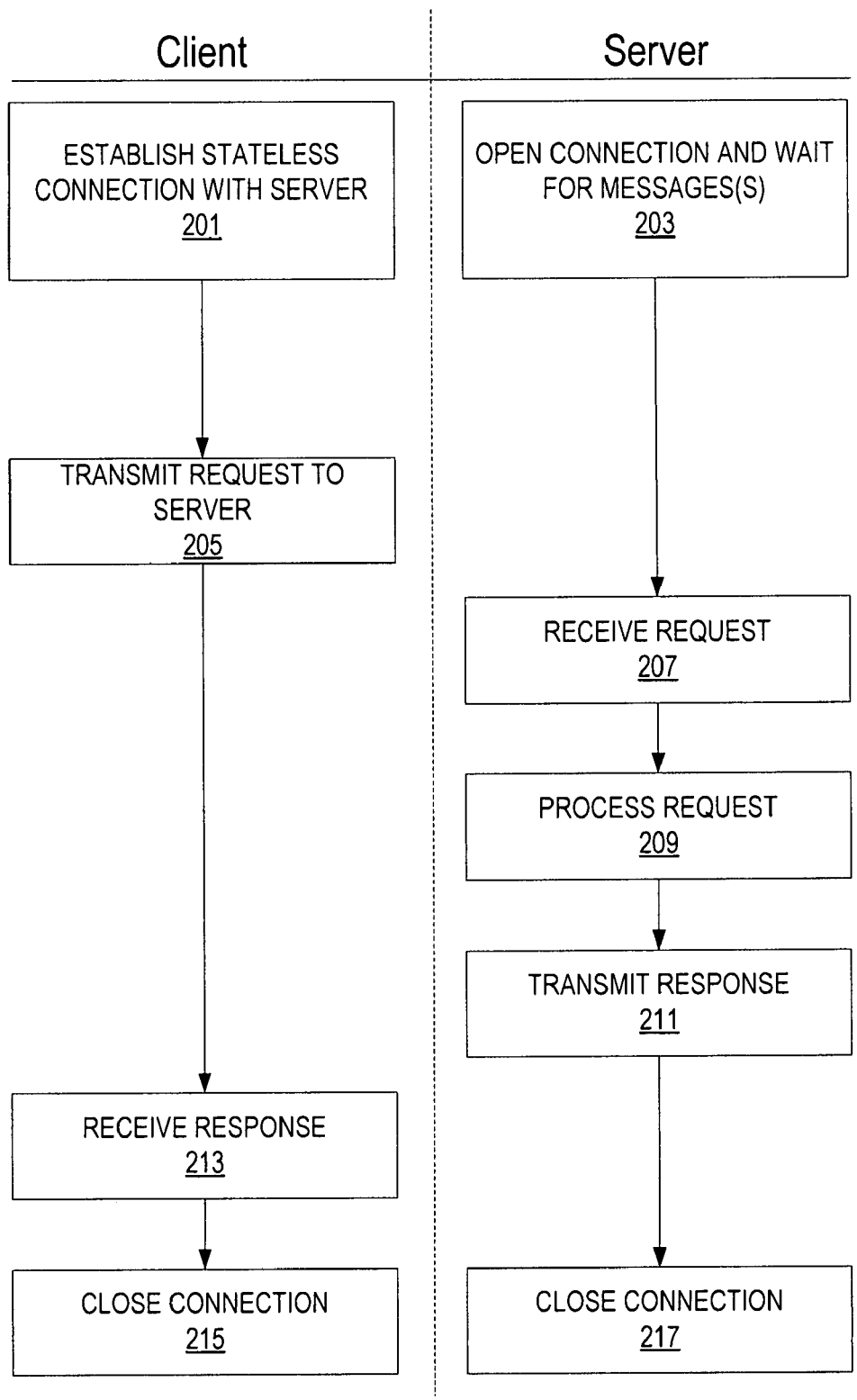
FIG. 2 illustrates a prior art message transaction flow between a client and a server using a stateless HTTP connection.
Figure 3:
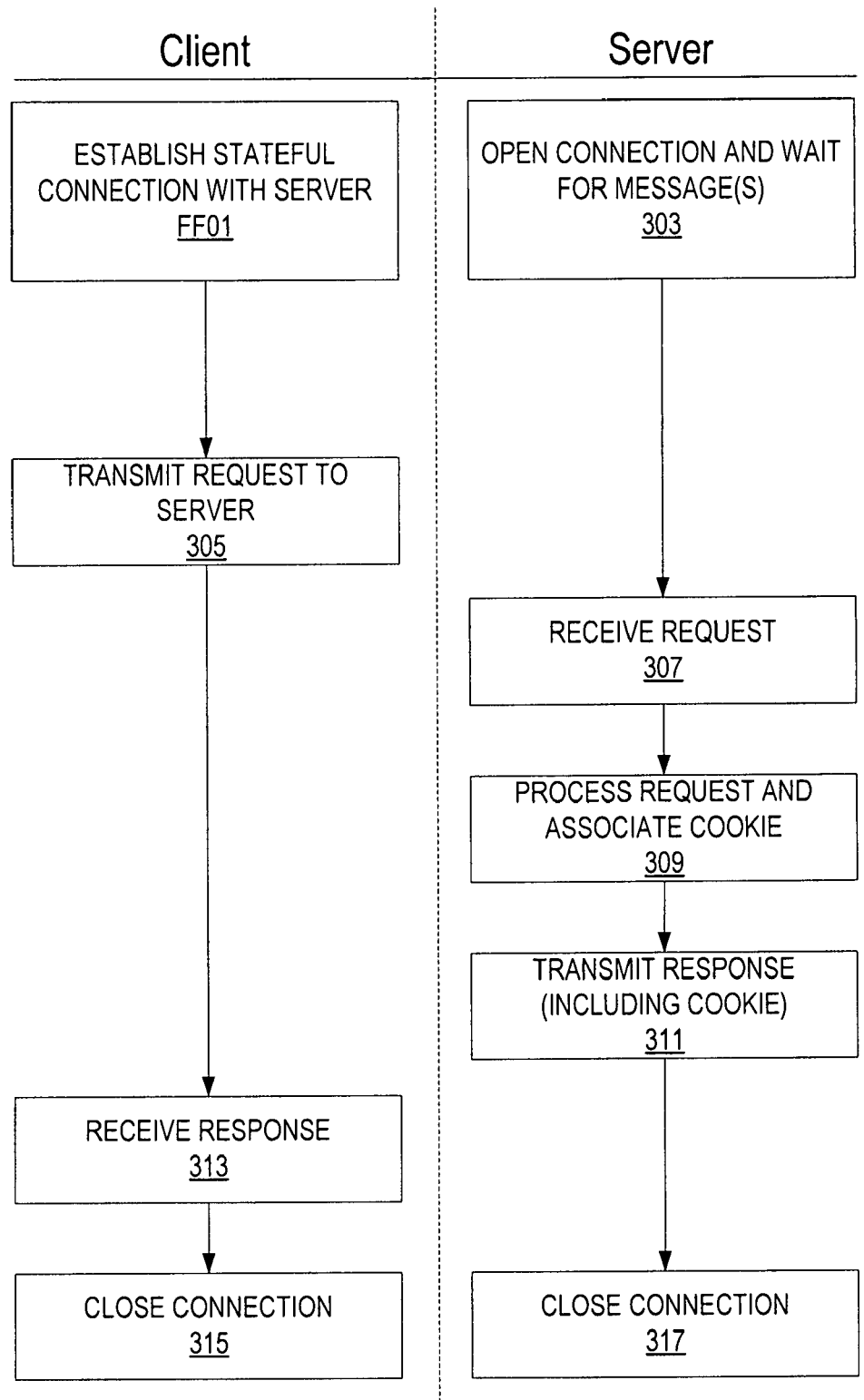
FIG. 3 illustrates a prior art message transaction flow between a client and a server using a stateful HTTP connection.

A system and method for virtual message packaging is described. A virtual package is collection of messages that share common characteristics and may be processed together. In one embodiment, messages are first grouped according to one or more rules at a client and then formed into a virtual package. In another embodiment, one or more messages are received at a server and then formed into a virtual package for later processing.

DETAILED DESCRIPTION

As described earlier, in prior art message transaction systems messages are sent individually from a client to a server, processed by the server immediately, and then a response message sent back to the client. Accordingly, grouping messages that are to be processed by the server together is not a trivial task. One possible solution is to not use several messages but to use a single SOAP message with very large payload containing all of the necessary requests/information. Unfortunately, this is often impossible to do because every message of a group may not have the same processing, formatting, and/or transmission requirements (for example, different security requirements could apply to payloads of different messages). Additionally, messages constructed in this manner have payloads that share the same header, signature, etc. and therefore live or die together. Any error in the transmission, reception, or processing of a part of the message would cause a rollback to the state prior to the reception of the message.

Another possible approach is to archive or "zip/rar/tar" a group of messages together. However, this shares the same pitfalls as creating a large payload and would not be standard compliant.

Virtual Message Packaging

A virtual package is a collection of messages that share common characteristics and may be processed together. Any number of messages may be in a virtual package. The number of messages in a virtual package is determined by the client, the user of the client, or the server. Virtual packages are used instead wrapping individual messages into "real" packages because there is no way to wrap a collection of messages that is both standards compliant and practical. For example, a collection of messages in a real package would have a single signature applicable to all of the messages in the package. If one of these messages were to be damaged or not received, then the entire package would be unusable because the signature would be destroyed.

Improved performance in messaging between a client and a server is achievable through the use of virtual message packaging on the client and/or server. A client using virtual messaging packing forms a virtual package consisting of several messages and transmits this "package" instead of each message individually, thereby improving performance.

A server utilizing virtual messaging packaging processes received messages in batches instead of individually and avoids the overhead associated with creating the required contexts to process each message individually.

Figure 4:
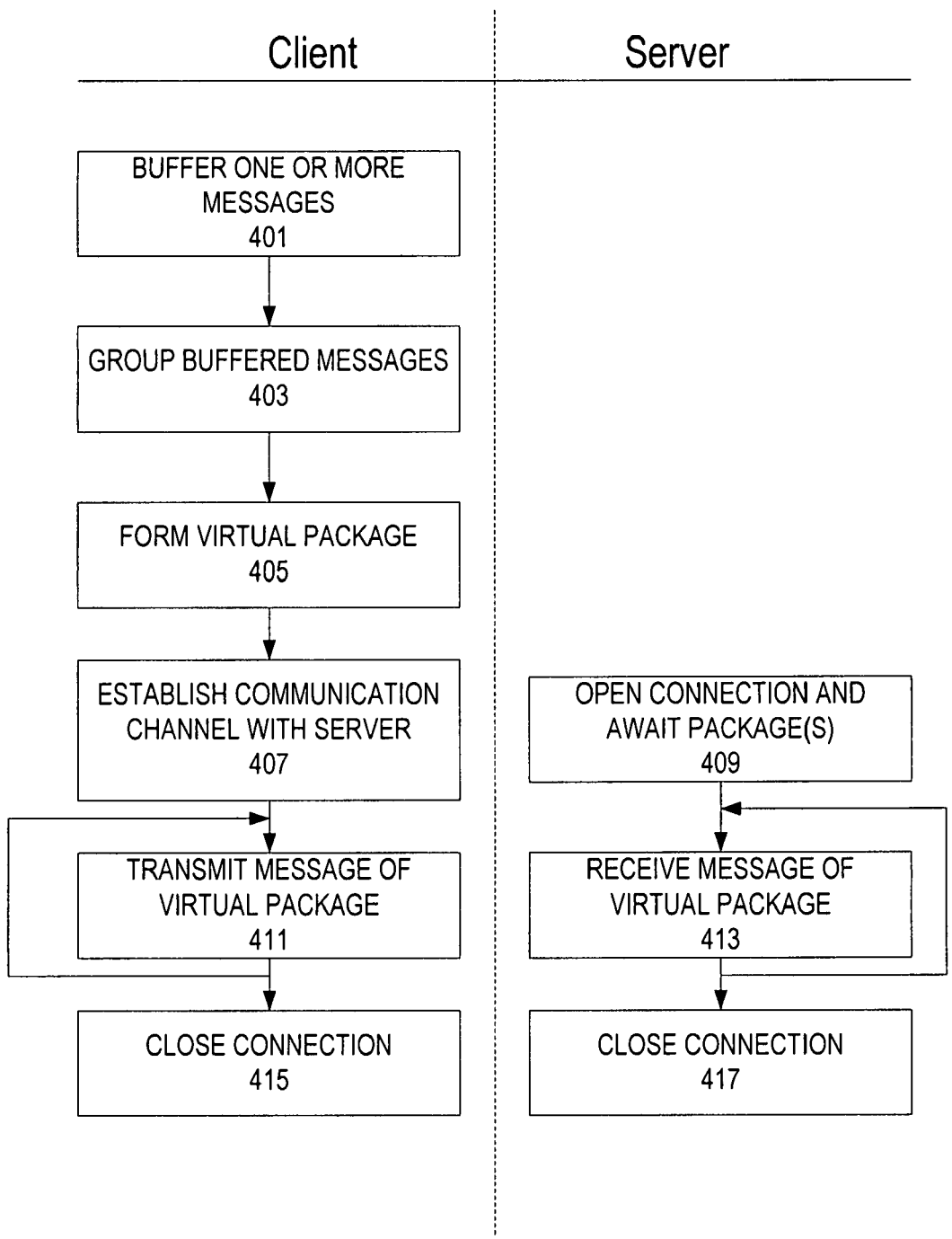
FIG. 4 illustrates an embodiment of a flow for using message packaging on the client side of a communication between a client and a server.

FIG. 4 illustrates an embodiment of a flow for using virtual message packaging on the client side of a communication between a client and a server. One or more messages to be transmitted from a client to a server are buffered at 401. Exemplary message types include HTTP, SOAP, etc.

These buffered messages are separated into groups according to one or more rules at 403. These rules include, but are not limited to: 1) grouping by message type (for example, messages belonging to the same Web service operation may be grouped together); 2) grouping together messages that are independent of each other and do not require sequential processing (although in some instances may use sequential processing); and/or 3) grouping together messages that do not require transactional processing (i.e., if one fails the others are still processed). Several different groups may be generated at 403 with each group being associated with a different virtual package.

A virtual package for a group is formed at 405. A virtual package is a collection of messages that share common characteristics and may be processed together. Any number of messages may be in a virtual package. As described above, virtual packages are used instead wrapping individual messages into a "real" package because there is no way to do wrap a collection of messages that is standards compliant or practical. A collection of messages in a traditional package would have a single signature applicable to all of the messages in the package and individual messages for that package are not severable for processing. For example, each message carries a message identifier, if multiple individual messages were to be merged together, then the message identifier becomes a package identifier and the individual messages no longer have their own individual identifier. Of course, one such an identifier could additionally be assigned to each message, but this addition means that the message identifier is it no longer transparent to both sides processing the messages because one would have to know where to look for the individual identifiers buried somewhere in the package.

The formation of the virtual package at 405 may be triggered by several different types of events. For example, when these messages are collected (buffered and grouped) individually, the formation of a virtual package may be triggered when one or more of the following occur: 1) a certain threshold of time has passed (for example, collect messages for an hour and then process them); 2) a pre-determined number of messages has been collected (for example, process the messages after 100 have been collected) and/or 3) a pre-determined message size has been collected (for example, process the messages after 10 MB worth of messages has been collected).

Alternatively, messages could be gathered within one user interaction and processed by the client and sent from the client based on the client receiving a user command.

A stateful communication connection is established with a server at 407. For example, a stateful HTTP connection is made with the server and the client logs onto the server. Any stateful connection type may be used. Stateful connections help reduce the impact of some performance bottlenecks such as logon and buffer issues. For example, in stateless HTTP connections, the server does not save information regarding which client sent what message after the message has been processed and clients connecting to the server have to logon each time they want to send a message. A stateful HTTP connection allows the client to not have to log on each time as that information is kept in the cookie associated with the complete transaction between the client and server. A stateful HTTP connection allows the server to more easily track which client is transmitting a certain message or virtual package and use that information to track the status of the transmission(s).

Of course other connection types may be used, but all connections require the authentication of the client by some means (username/password, certificate, ticket based authentication, etc.). An advantage of using a stateful connection is that this process is optimized by doing a full authenticating of the client with the first message and for the succeeding ones only verifying that they are still authenticated by the same client. Additionally, it does not matter to the server who sent the package, it's only important that the authentication for each message is performed.

The server opens a connection on its side and waits for the messages of the virtual package to be transmitted at 409. The virtual package is transmitted from the client at 411. The messages of the virtual package are sent one-by-one over the stateful connection until the virtual package is transmitted. The state of the connection serves as the grouping entity for the server receiving the packet. In other words, by knowing the state of the connection, the server knows if the complete virtual package has been sent (if the connection is still open then the virtual package has not been sent, whereas if the connection is closed then the virtual package has been sent).

The server receives the virtual package one message at a time at 413. As described above, the state of the connection may be used as a grouping entity for the server. In other words, the virtual package will have been deemed sent with the connection is closed. In most scenarios, the messages of the package are processed by the server has they arrive, however, the messages may be processed in groups or in a single group.

Virtual packages have the same positive qualities as using a single package wrapper (envelope) around all of the messages and have the additional benefit of being standard compliant (that is compliant with HTTP and Web services standards).

If a server only receives a partial virtual package before an error in the transmission, reception, or processing of the virtual package occurs, the transmission of the remainder of the virtual package may be restarted from the point of error. These types of errors may be common on congested lines or if the virtual package is large. The resumption of partial transmissions is possible because each message in the virtual package is therefore severable from the others of the package and transmitted separately over a stateful connection. With the knowledge of at what point the virtual package failed, the server may 1) request that the remainder of the virtual package be transmitted by the client; 2) may process at least some of the messages of the virtual package that it as already received; and/or 3) wait on processing at least some of (if not all of) the messages that it has received until the entire package has been received.

In a traditional messaging approach, all of the messages would have to be re-transmitted and reprocessed. Any processing that had been done on the portion that had been received would have to be rolled back to the state the server had been before the first message had been received.

Figure 5:
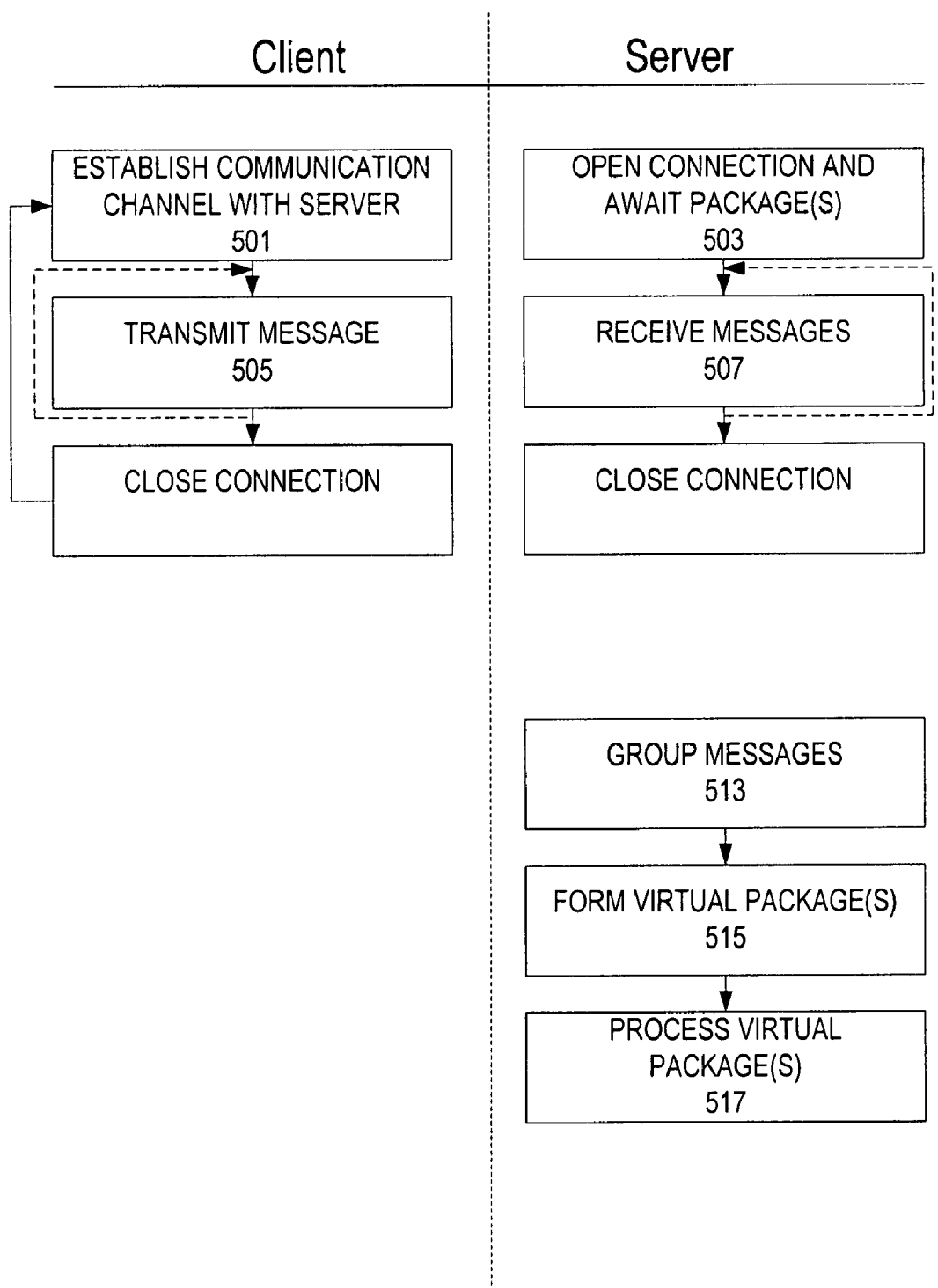
FIG. 5 illustrates an embodiment of a flow for using message packaging on the server side of a communication between a client and a server.

FIG. 5 illustrates an embodiment of a flow for using virtual message packaging on the server side of a communication between a client and a server. Utilizing message packaging, a server packages received messages for later group processing. Traditionally, each message had to be processed as it was received. As described earlier, this lead to problems when messages were received out-of-order and contributed to server side inefficiencies in that bulk message based transactions could not be performed.

A communication connection is established with a server at 501. For example, a stateful HTTP connection is made with the server and the client logs onto the server. As described with the respect to FIG. 4, any stateful connection type may be used.

The server opens a connection on its side and waits for the messages of the virtual package to be transmitted at 507. A stateful HTTP connection allows the server track which client is transmitting a certain message or virtual package and use that information to track the status of the transmission(s).

The client transmits message(s) to the server at 505. Exemplary message types include HTTP, SOAP, etc. Messages are sent one-by-one over the stateful connection. The client in this particular example has not created a virtual package and is sending messages as is well known in the art. The state of the connection serves as the grouping entity for the server receiving the messages. In other words, by knowing the state of the connection, the server knows which client is sending the messages and may group them accordingly.

The server receives the messages one message at a time at 507. One or more messages received from the client grouped (but not committed) at 513. For example, received messages may be grouped together to form an update or patch that is to be applied to the server. As described above, the state of the connection may be used as a grouping entity for the server. In other words, the server knows which client is transmitting the messages and associates them to that client accordingly.

A virtual package for a group is formed at 515. As described earlier, a virtual package is a collection of messages that share common characteristics and may be processed together. Any number of messages may be in a virtual package and may be determined by either the client (based on the status of the connection such that if the client closes the connection the package is complete or the transmission of an indication that it is done transmitting a particular group of messages that could form a virtual package) or by the server (based on, for example, the available resources for processing the messages received). In prior art systems, the server would commit (process) each message as it was received instead of grouping them into a package.

The virtual package is processed by the server at some point in time at 517.

Figure 6:
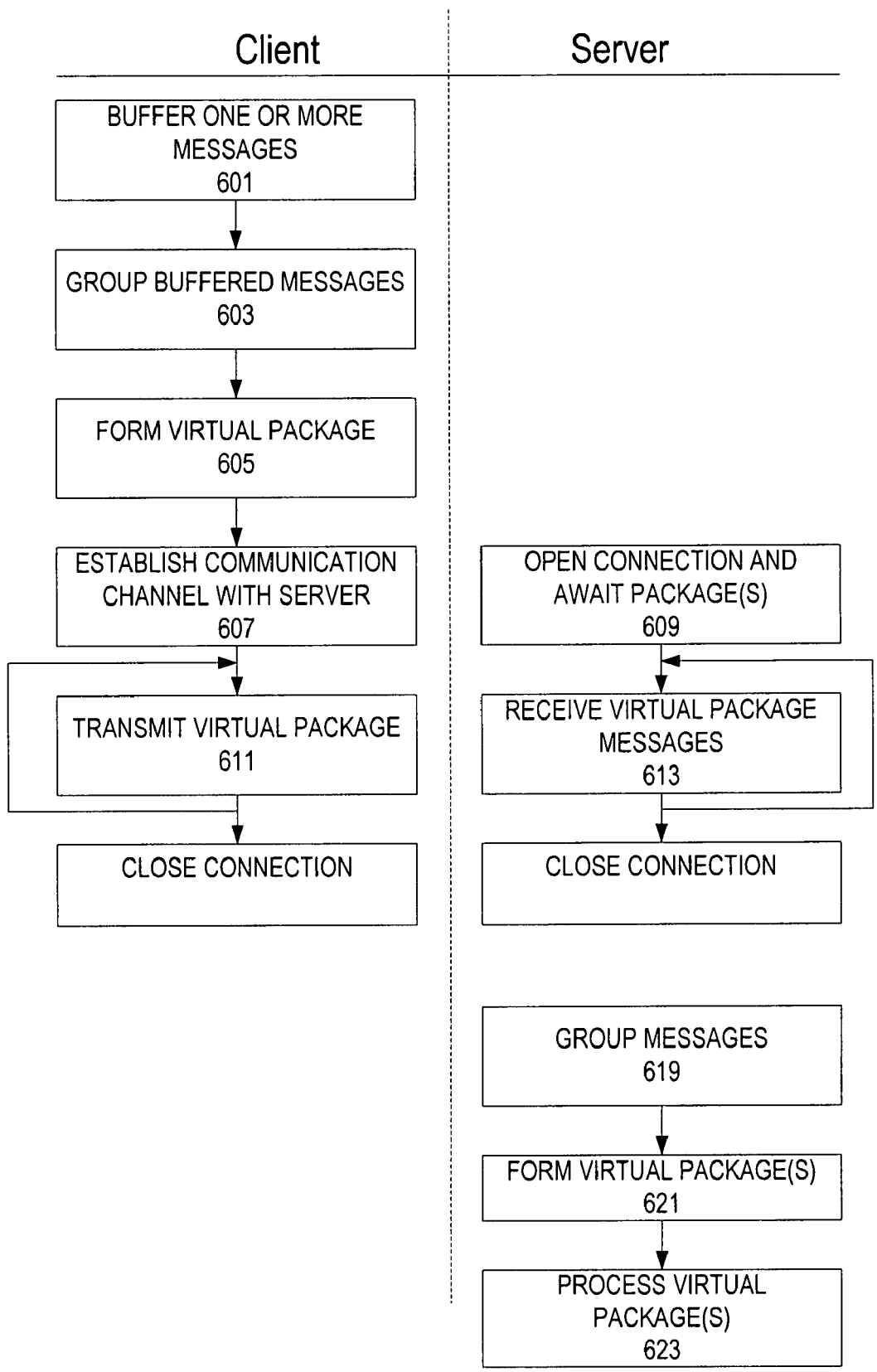
FIG. 6 illustrates an embodiment of a flow for using message packaging on both the server and client side.

FIG. 6 illustrates an embodiment of a flow for using virtual message packaging on both the server and client side.

One or more messages to be transmitted from a client to a server are buffered at 601. Exemplary message types include HTTP, SOAP, etc.

These buffered messages are separated into groups according to one or more rules at 603. These rules include, but are not limited to, the grouping rules described earlier. Several different groups may be generated at 603 with each group being associated with a different virtual package.

A virtual package for a group is formed at 605. The formation of the virtual package at 605 may be triggered by several different types of events as described earlier.

A stateful communication connection is established with a server at 617. For example, a stateful HTTP connection is made with the server and the client logs onto the server. Any stateful connection type may be used. Stateful connections help reduce the impact of some performance bottlenecks such as logon and buffer issues. For example, in stateless HTTP connections, the server does not save information regarding which client sent what message after the message has been processed and clients connecting to the server have to logon each time they want to send a message. A stateful HTTP connection allows the client to not have to logon each time as that information is kept in the cookie associated with the complete transaction between the client and server.

The server opens a connection on its side and waits for the messages of the virtual package to be transmitted at 609.

The virtual package is transmitted from the client at 611. The messages of the virtual package are sent one-by-one over the stateful connection until the virtual package is transmitted. The state of the connection serves as the grouping entity for the server receiving the packet.

The server receives the messages one message at a time at 613. One or more messages received from the client grouped (but not committed) at 619. A virtual package for a group is formed at 621. As described earlier, a virtual package is a collection of messages that share common characteristics and may be processed together. The virtual package is processed by the server at some point in time at 623.

Figure 7:
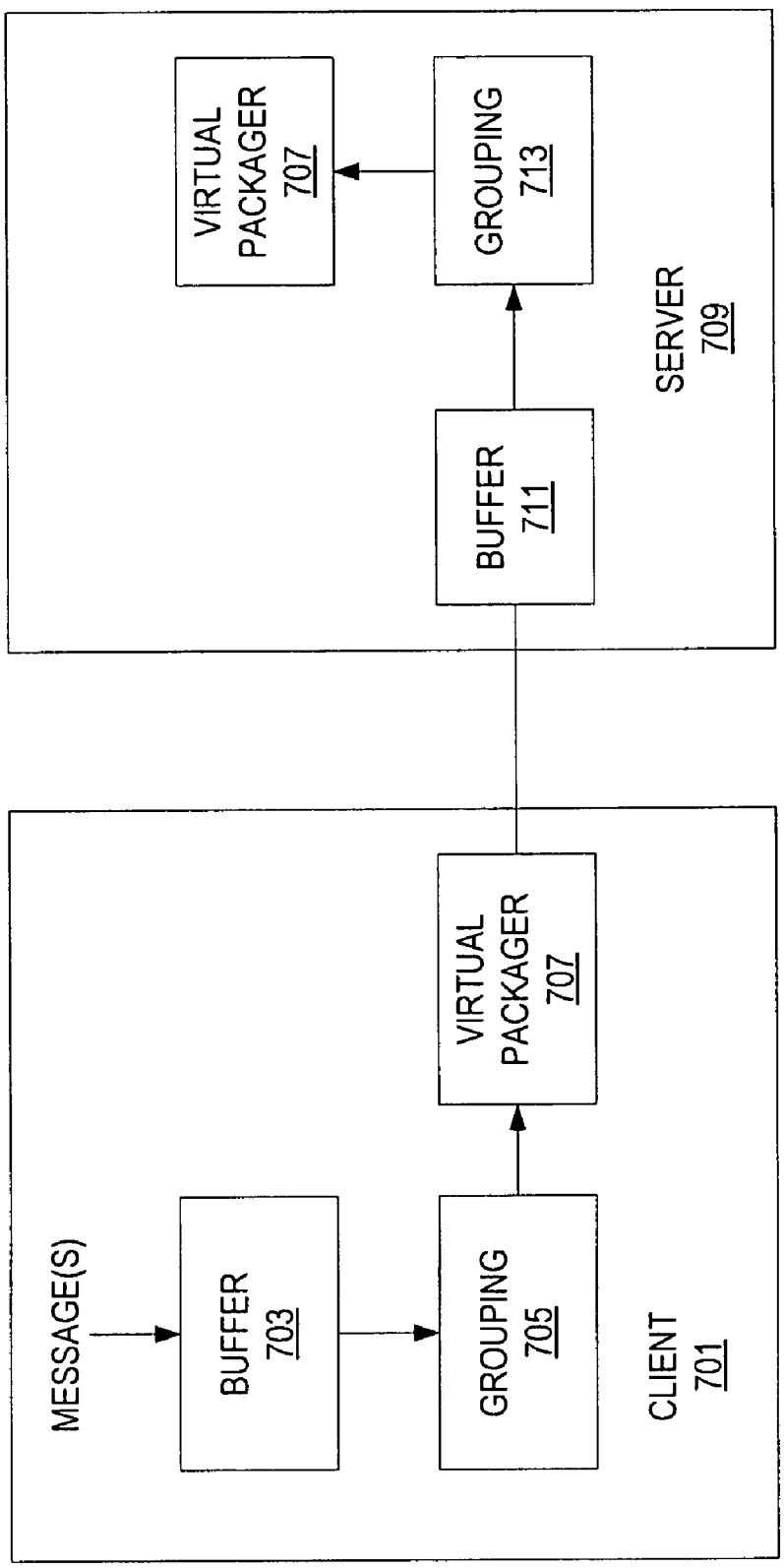
FIG. 7 illustrates an exemplary embodiment of a simplified client/server architecture utilizing virtual packaging.

FIG. 7 illustrates an exemplary embodiment of a simplified client/server architecture utilizing virtual packaging.

The client 701 processes messages that are sent to a server or servers. A buffer 703 buffers messages within the client 701 as described above. A group or groups of buffered messages is formed by grouping component 705. Finally, a virtual packager 707 creates virtual packages based on those groups.

The server 709 processes messages received from the client 701. These received messages may be transmitted as a virtual package from the client or transmitted by the client in a traditional fashion. A buffer 711 in the server temporarily holds messages received from the client 701 or other clients (not shown). A grouping component 713 groups messages according to the sender. Finally, a packager 715 forms a virtual package from a group created by the grouping component 713.

As illustrated, either the client 701 or the server 709 may utilize virtual packaging as described above. Of course, either of these components 701, 709 may be configured to not use virtual packaging and not include at least some of their respective sub-components. For example, if only the server 709 is configured to utilize virtual packaging, any client may be used and not necessarily one that includes a buffer 703, grouping component 705, and virtual packager 707 is shown and vice versa.

Closing Comments

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.).

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 8:
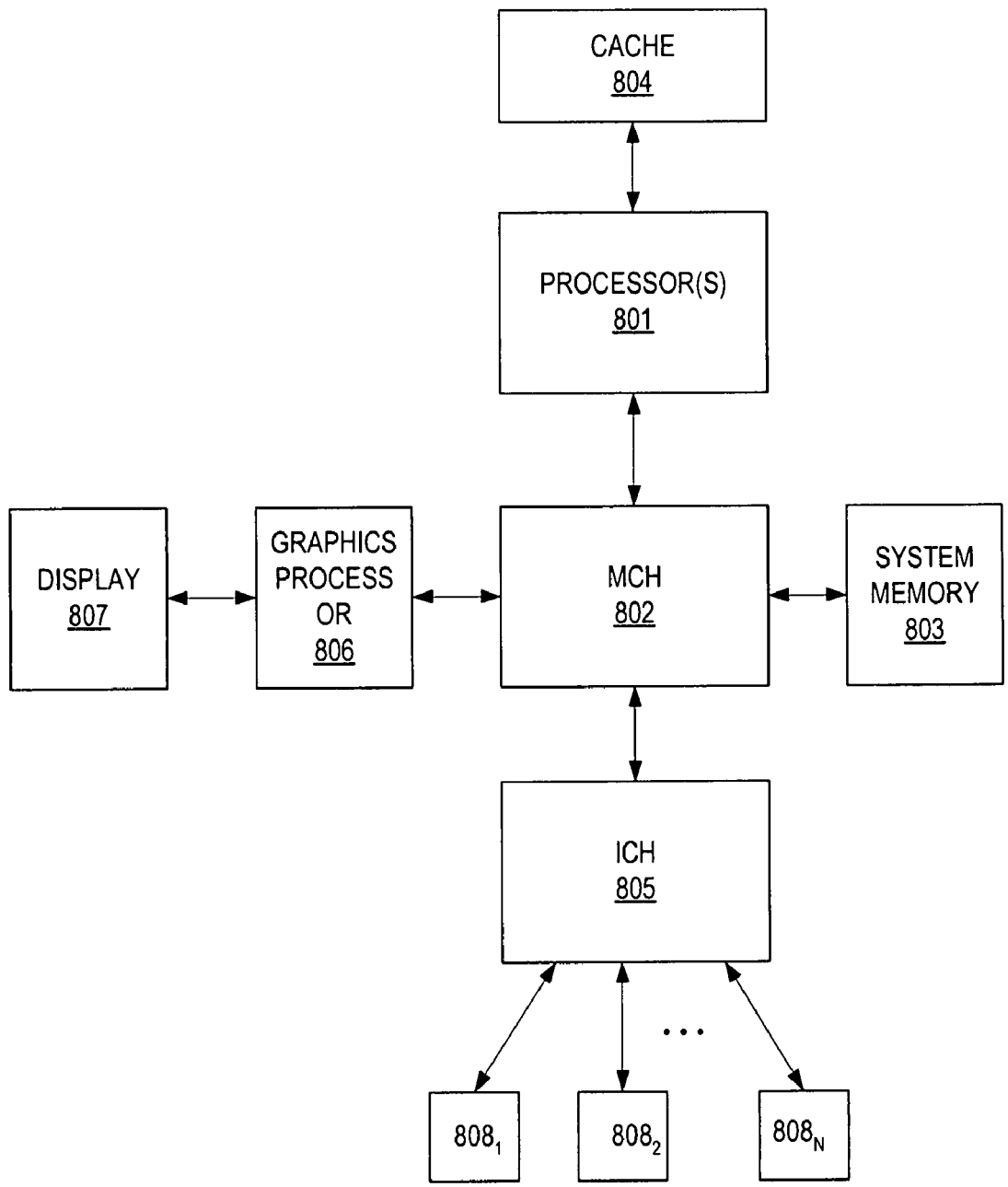
FIG. 8 shows an embodiment of a computing system.

FIG. 8 shows an embodiment of a computing system (e.g., a computer). The exemplary computing system of FIG. 8 includes: 1) one or more processors 801; 2) a memory control hub (MCH) 802; 3) a system memory 803 (of which different types exist such as DDR RAM, EDO RAM, etc); 4) a cache 804; 5) an I/O control hub (ICH) 805; 6) a graphics processor 806; 7) a display/screen 807 (of which different types exist such as Cathode Ray Tube (CRT), Thin Film Transistor (TFT), Liquid Crystal Display (LCD), DPL, etc.; 8) one or more I/O devices 808.

The one or more processors 801 execute instructions in order to perform whatever software routines the computing system implements. The instructions frequently involve some sort of operation performed upon data. Both data and instructions are stored in system memory 803 and cache 804. Cache 804 is typically designed to have shorter latency times than system memory 803. For example, cache 804 might be integrated onto the same silicon chip(s) as the processor(s) and/or constructed with faster SRAM cells whilst system memory 803 might be constructed with slower DRAM cells. By tending to store more frequently used instructions and data in the cache 804 as opposed to the system memory 803, the overall performance efficiency of the computing system improves.

System memory 803 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 803 prior to their being operated upon by the one or more processor(s) 801 in the implementation of a software program. Similarly, data that a software program determines should be sent from the computing system to an outside entity through one of the computing system interfaces, or stored into an internal storage element, is often temporarily queued in system memory 803 prior to its being transmitted or stored.

The ICH 805 is responsible for ensuring that such data is properly passed between the system memory 803 and its appropriate corresponding computing system interface (and internal storage device if the computing system is so designed). The MCH 802 is responsible for managing the various contending requests for system memory 803 access amongst the processor(s) 801, interfaces and internal storage elements that may proximately arise in time with respect to one another.

One or more I/O devices 808 are also implemented in a typical computing system. I/O devices generally are responsible for transferring data to and/or from the computing system (e.g., a networking adapter); or, for large scale nonvolatile storage within the computing system (e.g., hard disk drive). ICH 805 has bi-directional point-to-point links between itself and the observed I/O devices 808.

In the foregoing specification, the invention has been described with reference to specific exemplary embodiments thereof. It will, however, be evident that various modifications and changes may be made thereto without departing from the broader spirit and scope of the invention as set forth in the appended claims. For example, while the use of stateful connections (such as stateful HTTP) have been described above as the connection type between a server and a client, persistent connections may also be used with any of the above described flows and system diagrams. When using persistent connections, the TCP connection is not released for multiple messages. A flow or system utilizing HTTP/1.1 may support such functionality. The specification and drawings are, accordingly, to be regarded in an illustrative rather than a restrictive sense.

We claim:

1. A method comprising: grouping, by a computing system, at least two messages, the computing system comprising at least one processor;
   forming, by the computing system, a virtual package of the messages, wherein a virtual package is a collection of at least two messages that share common characteristics and may be processed together, each message carrying a unique message identifier; establishing a stateful connection between the computing system and a server, transmitting, by the computing system, the messages in the virtual package to the server for processing in batches, each message being transmitted in a separate payload, the state of the connection identifying messages in the virtual package at the server such that if the connection is open, the virtual package has not been sent, and if the connection is closed, the virtual package has been sent.

2. The method of claim 1, wherein the stateful connection is a Hypertext Transfer Protocol connection using at least one cookie to describe the connection.

3. The method of claim 1, wherein the grouping is determined by at least one rule selected from a group comprising:
   grouping messages of the same type together;
   grouping messages that are independent of each other and do not require sequential processing together; and
   grouping messages that do not require transactional processing together.

4. The method of claim 1, wherein the forming of a virtual package is triggered by at least one rule selected from a group comprising:
   triggering the formation of a virtual package when a predetermined threshold of time has passed;
   triggering the formation of a virtual package when a predetermined number of messages has been grouped; and
   triggering the formation of a virtual package when a predetermined message size has been grouped.

5. The method of claim 4, wherein the number of messages in the virtual package is determined by a client.

6. A method comprising: receiving, by a computing system, at least two messages, the computing system comprising at least one processor;
   grouping, by the computing system, the at least two me messages;
   forming, by the computing system, a virtual package of the at least two messages, wherein a virtual package is a collection of at least two messages that share common characteristics and may be processed together;
   establishing, by the computing system, a stateful connection with a client server;
   transmitting, by the computing system, in the virtual packages, the corresponding messages to the client server, the messages being transmitted in separate payloads for processing by the client server in batches; and terminating the stateful connection between the computing system and the client server once the messages are completely transmitted, termination of the stateful connection indicating that the virtual package has been transmitted.

7. The method of claim 6, wherein the stateful connection is an HTTP connection using at least cookie to describe the connection.

8. The method of claim 6, wherein the forming of the virtual package occurs when the stateful connection is terminated.

9. The method of claim 6, further comprising:
   receiving an indication that the virtual package should be formed.

10. The method of claim 6, further comprising:
    processing the messages in the virtual package.

11. A method comprising: grouping, by a computing system, at least two messages, the computing system comprising at least one processor;
    forming, by the computing system, a first virtual package of the messages, wherein a virtual package is a collection of at least two messages that share common characteristics and may be processed together, each message carrying a unique message identifier;
    establishing a stateful connection between the computer system and a server; transmitting, by the computing system, messages within the first virtual package to the server one at a time, the server processing received messages in batches;
    receiving at least one message from the first virtual package at the server;
    determining, by the sewer, whether the complete virtual package has been received based on a state of the connection; grouping the messages of the first virtual package at the server;
    and forming, by the server from at least a portion of the messages in the first virtual package, a second virtual package of the messages, wherein a virtual package is a collection of at least two messages that share common characteristics that are transmitted separately and may be processed together.

12. The method of claim 11, further comprising:
    processing the messages in the virtual package.

13. The method of claim 11, wherein the stateful connection is an HTTP connection using at least one cookie to describe the connection.

14. The method of claim 11, wherein the first grouping is determined by at least one rule selected from a group comprising:
    grouping messages of the same type together;
    grouping messages that are independent of each other and do not require sequential processing together; and
    grouping messages that do not require transactional processing together.

15. The method of claim 11, wherein the forming of the first virtual package is triggered by at least one selected from a group comprising:
    triggering the formation of a virtual package when a predetermined threshold of time has passed;
    triggering the formation of a virtual package when a predetermined number of messages has been grouped; and
    triggering the formation of a virtual package when a predetermined message size has been grouped.

16. The method of claim 13, wherein if the server only receives a partial virtual package before an error in transmitting, receiving, or processing of the virtual package occurs, transmission of remaining messages in the virtual package is restarted at a point specified by the cookie.

* * * * *